Dec. 16, 1958 — J. ISREELI — 2,864,396
VOLUME CONTROL FOR FRACTION COLLECTORS
Filed Oct. 9, 1956
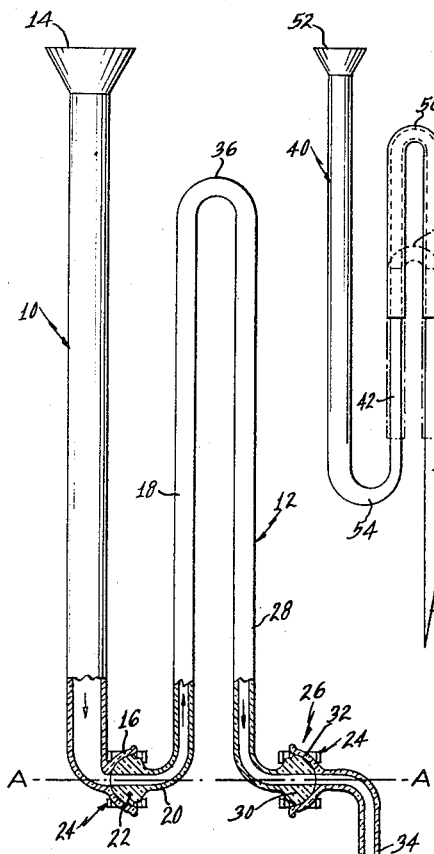
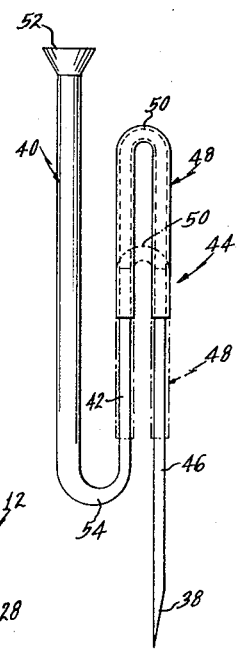
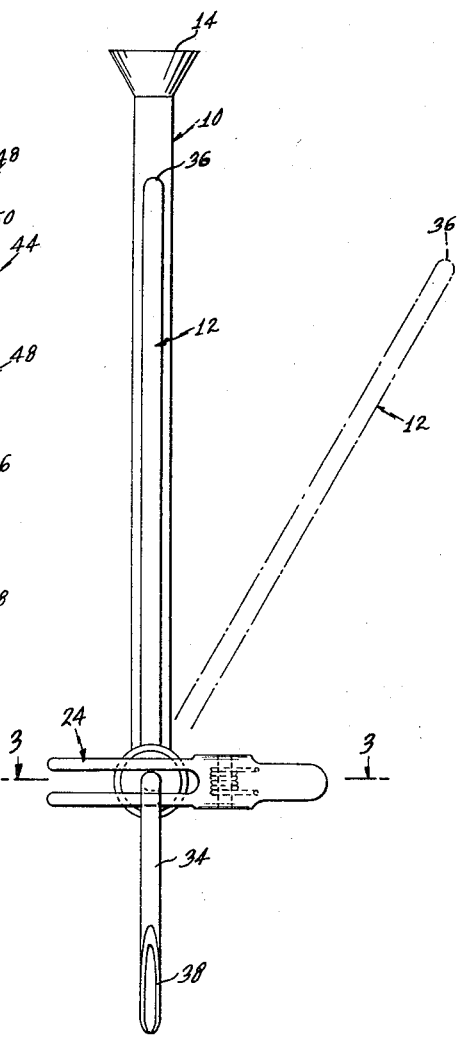
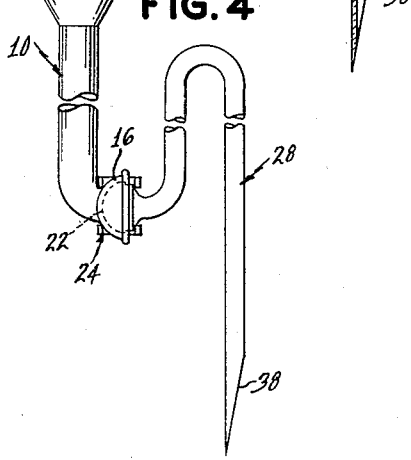
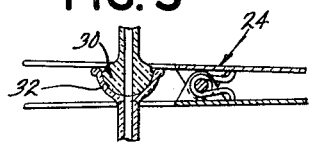
INVENTOR.
Jack Isreeli
BY
ATTORNEYS

United States Patent Office 2,864,396
Patented Dec. 16, 1958

2,864,396

VOLUME CONTROL FOR FRACTION COLLECTORS

Jack Isreeli, Tuckahoe, N. Y., assignor to Technicon Chromatography Corporation, Chauncey, N. Y., a corporation of New York Application October 9, 1956, Serial No. 614,954

6 Claims. (Cl. 137—132)

The present invention relates to liquid measuring and delivery apparatus.

The primary object of this invention is the provision of apparatus capable of measuring and delivering with a high degree of accuracy predetermined volumes of liquid, especially small volumes of the order of a few cubic centimeters, from a supply receptacle to a receiver.

Another object of the present invention is the provision of liquid measuring and delivery apparatus which, while being accurately adjustable in a very simple way, is devoid of valves or the like, and concomitantly is devoid of valve actuating mechanisms.

The above and other objects, features and advantages of the invention will be fully understood from the following description considered in connection with the accompanying illustrative drawings.

In the drawings, the presently preferred embodiment is illustrated in Figs. 1, 2 and 3 of the drawings.

Fig. 1 is an enlarged vertical side view, partly in elevation and partly in section, of liquid measuring and delivery apparatus embodying the present invention;

Fig. 2 is a view in elevation of the apparatus as seen from the right of Fig. 1;

Fig. 3 is a sectional view on the line 3—3 of Fig. 2;

Fig. 4 is a vertical side view of the apparatus in elevation, on a smaller scale than in Fig. 1, showing a modification of the invention;

Fig. 5 is a vertical side view of the apparatus in elevation on a smaller scale than in Fig. 1, showing another embodiment of the invention.

Referring to the drawings in detail, and first to the invention as illustrated in Figs. 1 to 3, the apparatus comprises a tubular receptacle 10 and a syphon 12, which are both preferably made of glass or a suitable plastic, but which may be made of metal or any other suitable material. The tubular receptacle 10 has a top inlet 14 and is open to the atmosphere at said inlet. The lower end of receptacle 10 is provided with a liquid outlet which as here shown is in the form of a socket 16 for a purpose which will presently appear. The up-leg 18 of the syphon has a laterally directed lower portion 20, forming the liquid inlet 22 of the syphon. Parts 16 and 22 have mating inner and outer spherical surfaces, respectively, and are held in fluidtight relation by a spring clamp 24 (Fig. 3) which illustrates the joint 26 at the down-leg and discharge part of the syphon. It will be understood that the joint provided by the parts 16 and 22 between the outlet of the receptacle 10 and the up-leg of the syphon is, as here shown, the same as the joint 26. More specifically, the joint at the down-leg 28 of the syphon comprises the portion 30 which is received in the socket portion 32 of the downwardly extending discharge end portion 34 of the syphon. Thus it is seen, that the main or U-tube part of the syphon is movable about the horizontal axis A—A for adjusting the vertical position of the bend 36 of the syphon, between the up and down legs thereof, in relation to the receptacle 10 for predetermining the discharge operation of the syphon in accordance with the level of the liquid in the receptacle.

It will be understood that the receptacle 10 may be supported in stationary vertical position in any suitable way in relation to a source of liquid and that by pivoting syphon 12 at the joint 16, 22, the liquid received in the receptacle 10 will be automatically discharged by the syphon as soon as the liquid rises in receptacle 10 to a predetermined level according to the adjusted position of the syphon bend 36. The discharge tube or lower part 34 of the down-leg of the syphon can be maintained in vertical position irrespective of the inclination of the other part of the syphon so as to avoid any interference with the down flow of the liquid through tube 34 in case the latter is positioned within a comparatively narrow receptacle, and this also avoids, more generally, any interference with the discharge operation of the syphon. It will be observed that the lower end 38 of the discharge leg of the syphon is beveled so that the outlet opening of the syphon is enlarged so as to preclude the closing of the outlet of the syphon by liquid bubbles which might otherwise be formed.

In the form of the invention illustrated by Fig. 4, the joint in the down-leg of the syphon is omitted, but in other respects this form of the invention is the same as that illustrated by Figs. 1 to 3.

In the embodiment of the invention illustrated by Fig. 5, the pivotal movement of the syphon in relation to the supply receptacle is omitted and in lieu thereof the syphon itself is provided with relatively movable parts which can be adjusted for the purpose of adjustably locating the bend of the syphon between the up and down legs thereof in relation to the receptacle. As here shown, the supply receptacle 40 may be made integral with a part 42 of the up-leg of the syphon indicated generally at 44. The syphon comprises the down-leg part 46 and the U-part 48 which is slidable longitudinally of the up and down leg parts 44 and 46 of the syphon, in fluid-tight relation therewith. The fluid-tight fit between part 48 and parts 42 and 46, respectively, of the syphon, can be the same as that provided between the piston and cylinder or a glass syringe, and as such fluid-tight contacting surfaces are well known, further explanation thereof is unnecessary.

It will be readily understood in view of this disclosure that by moving the part 48 of the syphon vertically in relation to the parts 42 and 46, the bend 50 between the up and down legs of the syphon can be easily adjusted for predetermined discharge operation of the syphon in accordance with the liquid level of the receptacle 40. The inlet for the receptacle 40 is indicated at 52, said inlet being open to the atmosphere, and the outlet of said receptacle and the inlet to the up-leg of the syphon may be indicated as the common integral portion 54 between the receptacle 40 and the syphon 44. It will be understood, however, that the up-leg part 42 of the syphon may be made as a separate piece and provided with means for connecting it to any suitable receptacle.

The above described apparatus may be used for various purposes. For example, this apparatus may be used for fraction collection purposes in chromatography analysis. Ordinarily, in the case of such use, the liquid received in receptacle 10 (or 40) will be in the form of drops which flow from the lower end of the chromatography column. The drops will enter receptacle 10 through the upper end 14 thereof and will collect in said receptacle to a level predetermined according to the adjustment of the bend of the siphon, between the up and down legs thereof, so that when a predetermined volume of liquid collects in said receptacle it will be discharged therefrom into a suitable receiver (not shown) and this operation may be repeated at intervals according to the quantity of liquid discharged from the chromatography column and the adjustment of the siphon. It will be understood that normally for each discharge operation of the siphon, the discharged volume of liquid will flow into a different receptacle, for example in a series of receptacles, respectively, on a movable rack such as that shown, for example, in Patent No. 2,710,715, and other patents for Automatic Fraction Collection Apparatus assigned to the assignee of my present application, or the predetermined volumes of liquid successively discharged from the receptacle 10 by the siphon may be transmitted to a colorimeter in the manner disclosed, for example, in the application filed concurrently herewith by me, Andres Ferrari, Jr. and Edwin C. Whitehead for United States Letters Patent for Analysis and Recording Apparatus and Method.

It will be understood that when the device of the present invention is used with an automatically moved receptacle carrier as shown for example by Patent No. 2,710,715, the time and/or drop counter controls provided in said apparatus will be dispensed with as the means for controlling the volume of liquid received in each of the test tubes, and that any other suitable control device for operating the carrier to move the test tubes, respectively, into positions below the outlet 38 of the siphon can be employed and does not form in itself any part of the present invention. In this connection it will be understood that an electric circuit operable under the control of a liquid-level sensing device associated with receptacle 10 (or 40) may be provided for controlling the movements of the receptacle rack. On the other hand, it will also be understood that for certain purposes the receptacles may be manually placed in position beneath the outlet 38 of the syphon and may be removed manually, if so desired, instead of using an automatic carrier for the receptacles.

While I have shown and described the preferred mode of practicing my invention, as well as modifications thereof, it will be understood that various changes in the details of construction and in the form and arrangement of parts and other forms or modifications of the invention will readily occur to those skilled in the art in view of the present disclosure. Accordingly, I do not wish to limit the invention to the specific apparatus here shown and described, except to the extent which may be required by the scope of the appended claims.

Having thus described my invention, what I claim and desire to secure by Letters Patent is:

1. Liquid measuring and delivery apparatus, comprising a receptacle for a supply of the liquid to be measured and delivered, said receptacle having a liquid inlet and a liquid outlet, a siphon having its up leg provided with a liquid inlet in communication with said outlet, said liquid outlet of the receptacle and said liquid inlet of the siphon comprising interfitting relatively movable parts adjustable about a horizontal axis to adjust the vertical position of the bend of the siphon between the up and down legs thereof in relation to the receptacle for predetermining the discharge operation of the siphon in accordance with the liquid level in the receptacle, the down leg of said siphon comprising an upper part and a lower outlet part movably connected to said upper part for movement about a horizontal axis.

2. Liquid measuring and delivery apparatus, comprising a receptacle for a supply of the liquid to be measured and delivered, said receptacle having a liquid inlet and a liquid outlet, a siphon having its up leg provided with a liquid inlet in communication with said outlet, said liquid outlet of the receiver comprising a socket portion and said liquid inlet of the siphon comprising a portion engageable in said socket portion in movable fluid-tight relation therewith whereby the siphon is adjustable about a horizontal axis to adjust the vertical position of the bend of the siphon between the up and down legs thereof in relation to the receptacle for predetermining the discharge operation of the siphon in accordance with the liquid level in the receptacle.

3. Liquid measuring and delivery apparatus, comprising a receptacle for a supply of the liquid to be measured and delivered, said receptacle having a liquid inlet and a liquid outlet, a siphon having its up leg provided with a liquid inlet in communication with said outlet, said liquid outlet of the receiver comprising a socket portion and said liquid inlet of the siphon comprising a portion engageable in said socket portion in movable fluid-tight relation therewith whereby the siphon is adjustable about a horizontal axis to adjust the vertical position of the bend of the siphon between the up and down legs thereof in relation to the receptacle for predetermining the automatic discharge operation of the siphon in accordance with the liquid level in the receptacle, the down leg of said siphon comprising an upper part terminating in a socket portion, and a lower discharge part for said down leg comprising a portion engageable in said socket portion of the down leg in movable fluid-tight relation therewith so that said adjustment of the siphon can be made without substantial displacement of said discharge portion from an upright vertical position.

4. Liquid measuring and delivery apparatus for automatically discharging a predetermined quantity of liquid from a supply receptacle, comprising a siphon tube having its up leg provided at its inlet portion with an integral joint element adapted to be releasably connected to a companion joint element at the outlet of the supply receptacle for movement about a horizontal axis for predetermining the discharge operation of the siphon in accordance with the liquid level in the receptacle, the down leg of said siphon comprising an upper part and a lower outlet part movably connected to said upper part for movement about a horizontal axis.

5. Liquid measuring and delivery apparatus for automatically discharging a predetermined quantity of liquid from a supply receptacle, comprising a siphon tube having its up leg provided at its inlet portion with an integral joint element adapted to be releasably connected to a companion joint element at the outlet of the supply receptacle for movement about a horizontal axis for predetermining the discharge operation of the siphon in accordance with the liquid level in the receptacle, the down leg of said siphon comprising an upper part terminating in a socket portion, and a lower discharge part for said down leg comprising a portion engageable in said socket portion of the down leg in movable fluid-tight relation therewith so that said adjustment of the siphon can be made without substantial displacement of said discharge portion from an upright vertical position.

6. Liquid measuring and delivery apparatus, comprising a receptacle for a supply of the liquid to be measured and delivered, said receptacle having a liquid inlet and a liquid outlet, a siphon having its up leg provided with a liquid inlet in communication with said outlet, said liquid outlet of the receiver comprising a socket portion with an internal spherical surface and said liquid inlet of the siphon comprising a portion with an external spherical surface engageable in said socket portion in movable fluid-tight relation therewith whereby the siphon is adjustable about a horizontal axis to adjust the vertical position of the bend of the siphon between the up and down legs thereof in relation to the receptacle for predetermining the discharge operation of the siphon in accordance with the liquid level in the receptacle.

References Cited in the file of this patent

UNITED STATES PATENTS

| 248,574 | Bunkhardt | Oct. 25, 1881 |
| 378,811 | Tyler | Feb. 28, 1888 |
| 892,382 | Omond | June 30, 1908 |
| 1,383,167 | Stenberg | June 28, 1921 |
| 2,021,247 | Waugh | Nov. 19, 1935 |
| 2,229,122 | Pershing | Jan. 21, 1941 |
| 2,436,029 | Wrisley | Feb. 17, 1948 |